United States Patent
Richman

(10) Patent No.: US 10,575,055 B2
(45) Date of Patent: Feb. 25, 2020

(54) USING AUTOMATIC CONTENT RECOGNITION (ACR) TO WEIGHT SEARCH RESULTS FOR AUDIO VIDEO DISPLAY DEVICE (AVDD)

(71) Applicant: Sony Corporation, Tokyo (JP)

(72) Inventor: Steven Richman, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/206,795

(22) Filed: Jul. 11, 2016

(65) Prior Publication Data

US 2018/0014071 A1   Jan. 11, 2018

(51) Int. Cl.
| | |
|---|---|
| H04N 21/462 | (2011.01) |
| H04N 21/482 | (2011.01) |
| H04N 21/44 | (2011.01) |
| H04N 21/442 | (2011.01) |
| H04N 21/45 | (2011.01) |
| H04N 21/84 | (2011.01) |
| H04N 21/431 | (2011.01) |

(52) U.S. Cl.
CPC ..... *H04N 21/4622* (2013.01); *H04N 21/4312* (2013.01); *H04N 21/44008* (2013.01); *H04N 21/44204* (2013.01); *H04N 21/4532* (2013.01); *H04N 21/4826* (2013.01); *H04N 21/4828* (2013.01); *H04N 21/84* (2013.01)

(58) Field of Classification Search
CPC .............. H04N 21/4622; H04N 21/84; H04N 21/4826; H04N 21/4312; H04N 21/44204; H04N 21/44008; H04N 21/4828; H04N 21/4532
See application file for complete search history.

(56) References Cited

U.S. PATENT DOCUMENTS

| | | | | |
|---|---|---|---|---|
| 1,773,980 | A * | 8/1930 | Farnsworth | H01J 31/42 313/381 |
| 3,567,914 | A * | 3/1971 | Neese | H05K 3/0005 430/30 |
| 3,584,141 | A * | 6/1971 | Fujiwara | H03J 7/26 331/36 C |
| 3,849,729 | A * | 11/1974 | Van Baggem | H04H 60/40 346/37 |
| 4,337,480 | A * | 6/1982 | Bourassin | H04N 7/106 345/2.1 |
| 5,129,078 | A * | 7/1992 | Groves | G06F 13/124 710/36 |
| 5,724,567 | A * | 3/1998 | Rose | G06F 17/30699 707/999.002 |
| 6,839,680 | B1 * | 1/2005 | Liu | G06Q 30/0204 705/7.33 |
| 8,572,655 | B2 | 10/2013 | Arte et al. | |
| 8,893,167 | B2 * | 11/2014 | Sinha | G06T 1/0021 725/19 |

(Continued)

FOREIGN PATENT DOCUMENTS

WO   WO 2016017964 A1 *   2/2016   ............. H04H 20/38

*Primary Examiner* — Junior O Mendoza

(74) *Attorney, Agent, or Firm* — John L. Rogitz

(57) ABSTRACT

ACR is used to identify content viewed by a person watching an AVDD such as a smart TV. Content searches of multiple sources and source types may be conducted and the results arranged for presentation by weighting each item of the search result according to the ACR identifications of historical viewing.

11 Claims, 7 Drawing Sheets

(56) References Cited

U.S. PATENT DOCUMENTS

| | | | |
|---|---|---|---|
| 9,351,025 B1* | 5/2016 | Maughan | H04N 21/2407 |
| 9,516,377 B1* | 12/2016 | Chen | H04N 21/44008 |
| 9,824,372 B1* | 11/2017 | Seth | G06Q 30/0241 |
| 2004/0133571 A1* | 7/2004 | Horne | G06F 17/30867 |
| 2005/0010955 A1* | 1/2005 | Elia | G06F 3/0482 |
| | | | 725/88 |
| 2007/0039023 A1* | 2/2007 | Kataoka | H04N 5/44543 |
| | | | 725/46 |
| 2008/0134248 A1* | 6/2008 | Matsuda | H04N 5/44543 |
| | | | 725/46 |
| 2008/0307461 A1* | 12/2008 | Tanikawa | H04N 5/44543 |
| | | | 725/53 |
| 2009/0055385 A1* | 2/2009 | Jeon | H04N 5/44543 |
| 2010/0146530 A1* | 6/2010 | Bolyukh | H04N 21/8358 |
| | | | 725/14 |
| 2010/0186041 A1* | 7/2010 | Chu | G06F 17/30781 |
| | | | 725/46 |
| 2010/0293158 A1* | 11/2010 | Tomita | G06F 17/30864 |
| | | | 707/723 |
| 2011/0289525 A1* | 11/2011 | Dureau | H04H 60/72 |
| | | | 725/14 |
| 2012/0143816 A1* | 6/2012 | Zhang | G06F 17/30867 |
| | | | 707/607 |
| 2013/0145400 A1* | 6/2013 | Chang | H04N 21/42203 |
| | | | 725/53 |
| 2013/0205323 A1* | 8/2013 | Sinha | G06T 1/0021 |
| | | | 725/19 |
| 2013/0268557 A1* | 10/2013 | Pickersgill | H04N 21/422 |
| | | | 707/769 |
| 2014/0215507 A1 | 7/2014 | Wouhaybi et al. | |
| 2014/0244488 A1* | 8/2014 | Kim | G06Q 20/02 |
| | | | 705/39 |
| 2014/0282660 A1* | 9/2014 | Oztaskent | H04N 21/4828 |
| | | | 725/18 |
| 2014/0337868 A1* | 11/2014 | Garza | H04N 21/44218 |
| | | | 725/12 |
| 2016/0044357 A1* | 2/2016 | Wang | H04N 21/2668 |
| | | | 725/14 |
| 2016/0063124 A1* | 3/2016 | Lee | G06F 17/30867 |
| | | | 707/731 |
| 2016/0148334 A1* | 5/2016 | Petrovic | G10L 19/018 |
| | | | 382/100 |
| 2016/0149956 A1* | 5/2016 | Birnbaum | H04L 63/101 |
| | | | 726/1 |
| 2016/0165315 A1* | 6/2016 | Park | H04N 21/252 |
| | | | 725/14 |
| 2016/0299973 A1* | 10/2016 | Oakeson | G06F 17/30867 |
| 2016/0378762 A1* | 12/2016 | Rohter | G06F 17/30029 |
| | | | 707/728 |
| 2017/0017645 A1* | 1/2017 | Neumeier | G06F 17/3002 |
| 2017/0134809 A1* | 5/2017 | An | H04N 21/4758 |
| 2017/0329769 A1* | 11/2017 | Berg | G06F 17/3002 |

* cited by examiner

USING AUTOMATIC CONTENT RECOGNITION (ACR) TO WEIGHT SEARCH RESULTS FOR AUDIO VIDEO DISPLAY DEVICE (AVDD)

FIELD

The application relates generally to using ACR to weight search results for AVDDs.

BACKGROUND

Audio video display devices such as, to use an example for illustration, smart TVs, have multiple sources of content that is available for viewing through several different interfaces and applications. Content can be viewed from physical devices connected to the TV, such as a Blu-ray player, content applications residing on the TV, and from networked connections to the Internet and a Pay-TV Service Providers' video network. As understood herein, such content is largely stranded and unable to be combined due to separate rules for searching and lack of a unified user experience.

SUMMARY

As disclosed herein, by using the separate search structures available from various content sources, a smart TV can display aggregated search results. Search on devices with hard drives can be conducted by using a standard file system search of loaded content, as with a PC, set-top box (STB), or Blu-ray® or digital video disk (BD/DVD) with file structures. Search of a service provider's broadcast offerings or video-on-demand (VOD) system can be done through an electronic program guide (EPG) or through the "cloud" environment facilitated by the Internet using application programming interfaces (APIs) provided by the service provider. Search of an Internet content provider can be done by using the subscriber's login and password information to allow access to the website to initiate a search, or by using the website's free search capability. APIs can also be provided by application providers such as Amazon or Netflix for standard ways of searching for content, or by accessing their website and doing limited title searching.

Thus, whether searches are conducted using a file based system, a web based or hypertext markup language HTML5-based system, or by advanced APIs designed for a specific application, individual search results can be collected and then organized.

How these searches get organized and presented is important in making them meaningful to the viewer. Once the individual content source elements have been searched, the combined results are categorized, filtered, and combined into a unified display on the TV.

According to present principles, each content element or selection is individually weighted based on a histogram of viewing that the viewer has accumulated through his viewing history. An automatic content recognition (ACR) program in the Smart TV can be used to create a weighting algorithm specific to each viewer. This algorithm is then used to take the collective search data and arrange it into meaningful categories that relate directly to the viewers interests.

Categories of search may be established by a directory of possible categories that can be supplied by the individual content sources, or can be provided by the TV itself for sorting. The top choices in each category or genre can be represented as carousels of content where each viewer chooses what type of content to watch and then sees a scrolling marquee or sequence of tiles that represents the content to be reviewed for playback. Because the amount of content available to be viewed otherwise can be too much in total to be digested and sifted through, the ACR capability of the TV sharpens the results such that the top rated or weighted titles are shown in each carousel of content, based on the most popular genres viewed and stored, e.g., in the TV's ACR cloud data server.

Accordingly, a device includes at least one computer memory that is not a transitory signal and that in turn includes instructions executable by at least one processor to execute automatic content recognition (ACR) on content presented by an audio video device (AVD). The instructions are executable to, based at least in part on the ACR, establish content weights, receive content search results, and present the content search results according to the content weights.

The content weights may include weights correlated to specific pieces of content. In addition or alternatively, the content weights may include weights correlated to types of content with a type of content including plural specific pieces of content.

In example embodiments, the instructions can be executable to present the content search results in an order defined at least in part by the content weights. The instructions may be executable to determine a number of search results to present according to the content weights. The content search results can include results from a search of at least two of: an electronic program guide (EPG), a video on demand (VOD) service, and the Internet.

In another aspect, a method includes searching at least two of: an electronic program guide (EPG), a video on demand (VOD) service, and the Internet according to a query, and then presenting on a display results of the search at least in part based on automatic content recognition (ACR) of previously viewed content.

In another aspect, an apparatus includes at least one display, at least one processor, and at least one computer memory including instructions executable by the at least one processor to use automatic content recognition (ACR) to identify content viewed by a person watching an audio video display device (AVDD). The instructions are executable to conduct content searches of multiple sources and source types responsive to content queries, and to arrange results of the content searches by weighting at least some items of the results of content searches according to the ACR of historical viewing.

The details of the present disclosure, both as to its structure and operation, can be best understood in reference to the accompanying drawings, in which like reference numerals refer to like parts, and in which:

DETAILED DESCRIPTION

Figure 1:
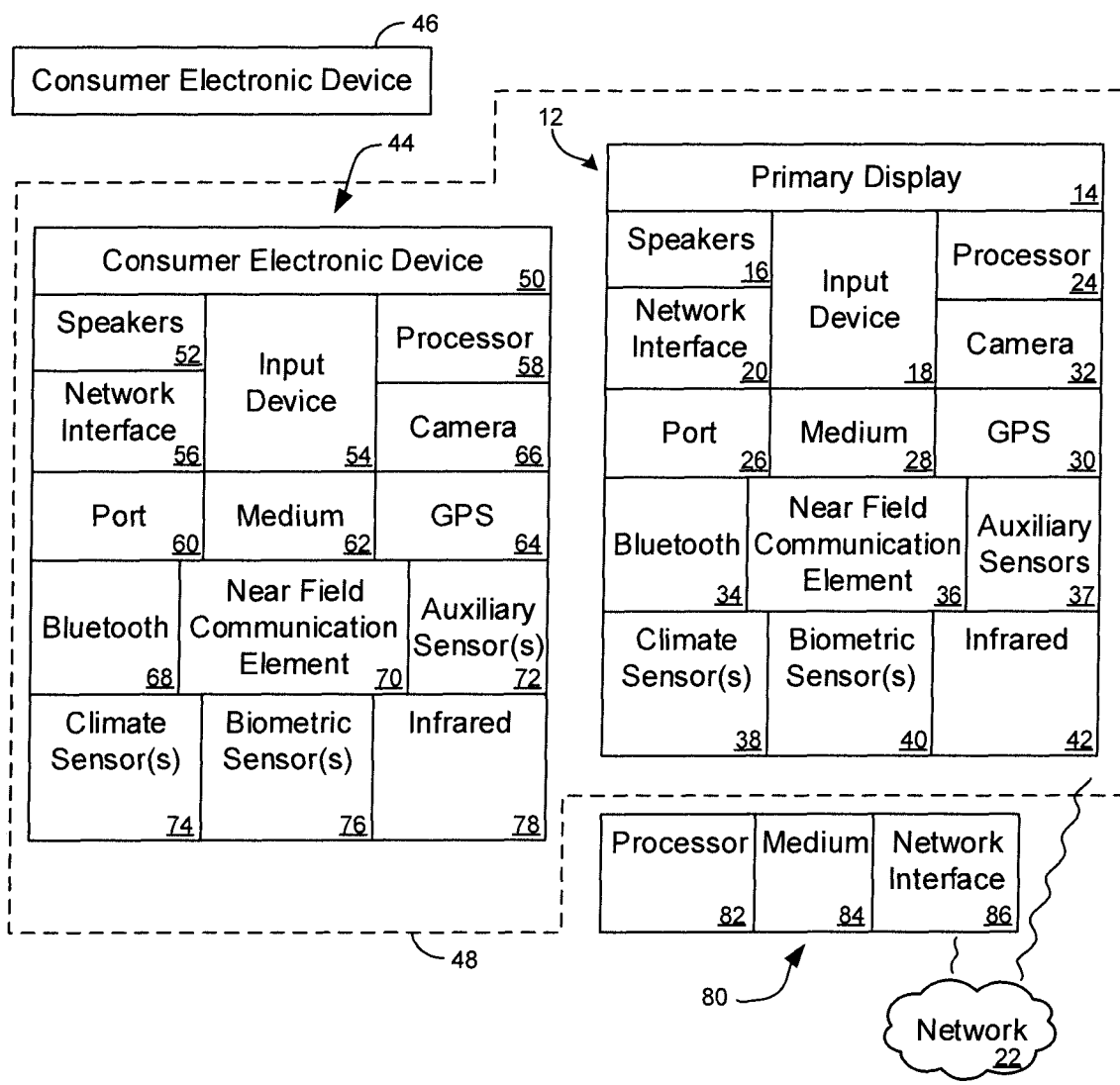
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone.

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
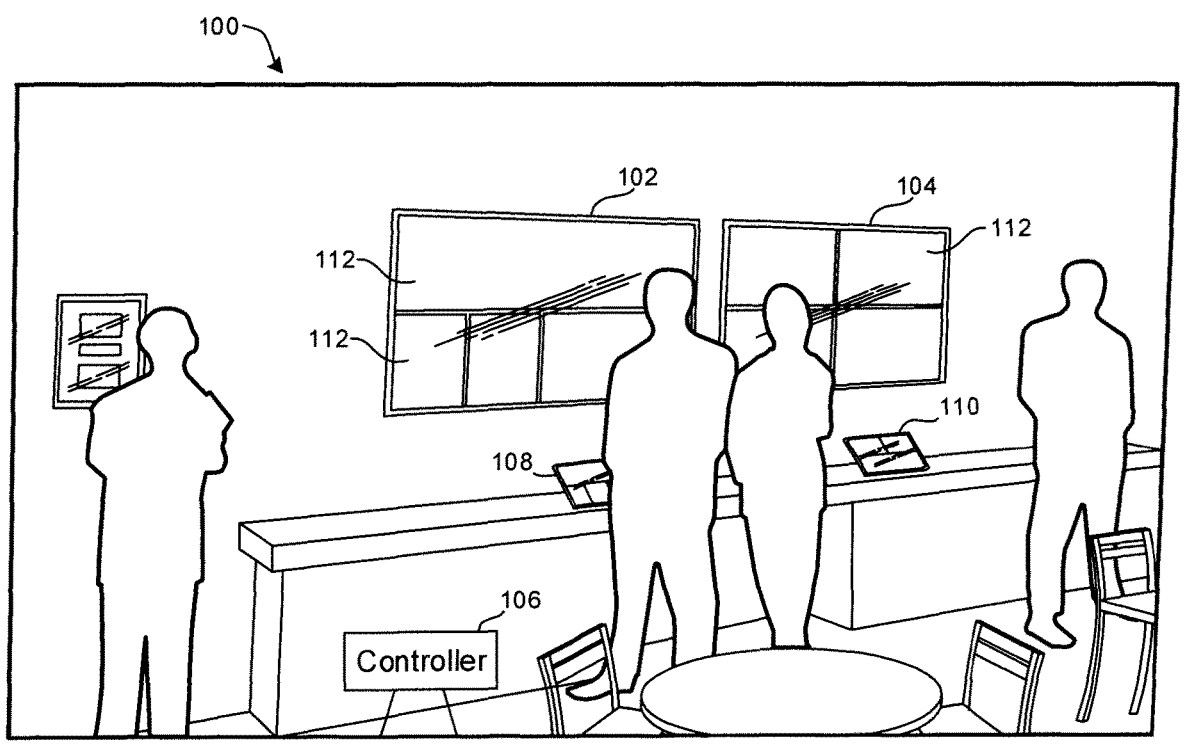
FIG. 2 is a partially schematic view of a specific example system with two UHD displays mounted on a wall side by side.

FIG. 2 shows an example system 100 in which one or more ultra high definition (UHD) displays 102, 104 are mounted on a wall, e.g., a wall of a home or a luxury stadium box. The UHD displays 102, 104 may be 4K displays. One or more control devices control presentation of the displays by sending commands wirelessly and/or over wired paths to one or more controllers. In the non-limiting example shown, a controller 106 controls the displays 102, 104, it being understood that a separate controller may be provided for each display. In the non-limiting example shown, content control on the first display 102 is established by a first control device 108 while content control on the second display 104 is established by a second control device 110, it being understood that a single control device may be used to establish control on both displays.

The control devices 108, 110 may be, without limitation, portable computers such as tablet computers or laptop computers (also including notebook computers) or other devices with one or more of the CE device 44 components shown in FIG. 1. The displays 102, 104 may be monitors only and/or may include one or more of the primary display 14 components shown in FIG. 1. The controller 106 may be a personal computer (PC) or game console or server that contains one or more of the components variously shown in FIG. 1. In the non-limiting example shown, the control devices 108, 110 communicate directly with the controller 106 using, e.g., WiFi or Bluetooth; the control devices 108, 110 do not communicate directly with the displays 102, 104. Instead, the controller 106 communicates with the displays 102, 104 to establish presentation thereon in accordance with commands received from the control devices. It is to be understood that while the controller 106 is shown physically separate from the displays in FIG. 2, it may be incorporated within the chassis of a display. As also shown, the displays may present plural contents in respective content windows 112.

The following description inherits the principles and components of the preceding discussion.

Now referring to FIG. 3, at block 300 a display device, like the display devices presenting screen shots described below and that may be implemented by the AVDD 12 of FIG. 1 or a STB or other computerized device, responds to an event trigger to execute ACR on content presented on the device or on another device. The trigger may be, e.g., a channel change of a device on which content is being viewed, an energization of a device, a periodic trigger established by the expiration of a timer, a selection of one of the search results discussed further below, or other appropriate trigger.

Proceeding to block 302, responsive to the trigger at block 300 an image or sound snapshot is taken of specific content currently being viewed on the AVDD, and then ACR executed on the image at block 304. At block 306 the specific content is identified based on the ACR results by, for example, using the ACR results as an entering argument into a local and/or cloud-based database of image templates and determining a closest match between the database and entering argument. The template in the database typically includes an identification of the specific piece of content as well as other metadata pertaining thereto.

In some embodiments, the concept of ACR primarily can be executed in the AVDD (TV) by use of a fingerprinting technology for audio or video streams that form the components of content source. The fingerprint can be taken from some portion of the sound waveform and/or digital video frame that is then compared to a large database of fully indexed content. Listening stations can be placed at major sourcing centers for content such as broadcast stations and networks who broadcast content and commercials. Also, libraries of content from studios also can be acquired and indexed.

Once the identity of the specific content is known by means of the ACR feature described above, the logic proceeds to block 308 to classify the specific content. This classification may be executed using one or more of a number of algorithms. For example, when the database includes metadata indicating the classification of a specific piece of content, that classification may be returned at block 308. Or, if specific content is recognized as being a sports program, it can be classified as "sports". Similarly, if a specific piece of content is recognized as a drama, it can be classified as such. Various levels of content classifications or types may be used. For example, if a specific piece of content being viewed is identified as being a baseball game between the Angels and Dodgers, it may classified, in order of increasing specificity, as "sports", "baseball", "Angels game", etc. The content may be further classified based on people recognized by the ACR. For example, if John Smith is recognized as pitching for the Angels, the classification accorded to the content may be "John Smith baseball games". Likewise, if Tobey Maguire is recognized by the ACR, the underlying content may be classified as "Tobey Maguire movie".

With the above in mind, in some example implementations, individual search results can be categorized by source into standard relational database structures. Once recorded that data can be comparatively analyzed for content completeness, sorted, and assigned a key structure like an entertainment identifier registry (EIDR) code for future reference. From that initial point of identifying and sorting all of the data sources involved in a search, the data can be indexed for further manipulation into subcategories and specific metadata tags. Indexing allows for further data refinement which adds more detailed metadata to added to content records to complete the content description, and useful other ancillary data for deeper referencing and segmenting. Additional data pulled from third party sources combines with the source data to fill out areas where information may be lacking.

By using a coding system for content such as EIDR, the capability to determine the same content coming from different sources is made possible (by comparing EIDR codes, for examples, of content from different sources to determine if the content is the same). Each content source and title can be uniquely determined and that makes the search criteria by provider even more accurate. A movie from one source may be differently encoded than another source, such as one being 4K and the other one being HD or SD. This level of detail helps the consumer to choose among content with the same title but with different presentation qualities or aspects. Additionally, the level of bandwidth can be a determining factor, whereby one selection is being streamed at a lower bit rate and thus the consumer wants to use less bandwidth.

For the purposes of segmenting playback quality and or cost of playback, factors such as whether the content is part of a Pay-TV subscription or not may be used to allow the preference engine and search algorithm to deliver free content first. The level of depth of integrating third party sourced data comes from the APIs they provide and what they included in their search or sorting capability.

Having an historical database of content viewed (list of EIDR codes) can provide an immediate reference to weight search content based on previous viewing patterns. A personal information server can store historical content codes tied to a device or profile, whereby historical viewing results can be compared to search results. A content information server can store all the searchable content available and its broadcast metadata. A content decision server can execute the algorithm that filters out search results from general content databases based on a consumer profile or device profile, and returns relevant personalized results.

The logic next moves to block 310 to assign weights to each specific piece of content recognized as having been viewed on the display device and/or to each content type or classification. The algorithm for doing this may be simple, e.g., each time a specific piece of content is recognized by means of ACR at blocks 304-308, its weight and/or the weight associated with the classification of the specific piece of content, initially zero (0), can be incremented by one. If a specific piece of content and/or type of content is not shown for an aging period, its weight may be decreased to reflect the viewer's apparent lack of interest in a previously-viewed content. Weights assigned to specific pieces of content may be greater than weights assigned to the classification in which the specific piece of content is placed, so that, for example, if a movie is being viewed, the specific movie may be assigned a weight of two whereas the type of the movie being viewed may be assigned a weight of one. The opposite may also be implemented, i.e., if a movie is being viewed, the specific movie may be assigned a weight of one whereas the type of the movie being viewed may be assigned a weight of two.

With further regard to weights, weights for content value may be determined by what the consumer is currently watching and interested in, added to Cloud or TV based preference data that provides a histogram of programs watched, their sources, time of day, and supportive descriptive data. Crowd-sourced preference data such as from an online rating service or a social media site can be integrated into the collection of metadata components which are given to specific titles of content and assigned specifics weights for levels of personal importance. The titles of content can then be given final search weights and indexed, such that the most relevant and time of day accurate content is presented for each search.

Figure 3:
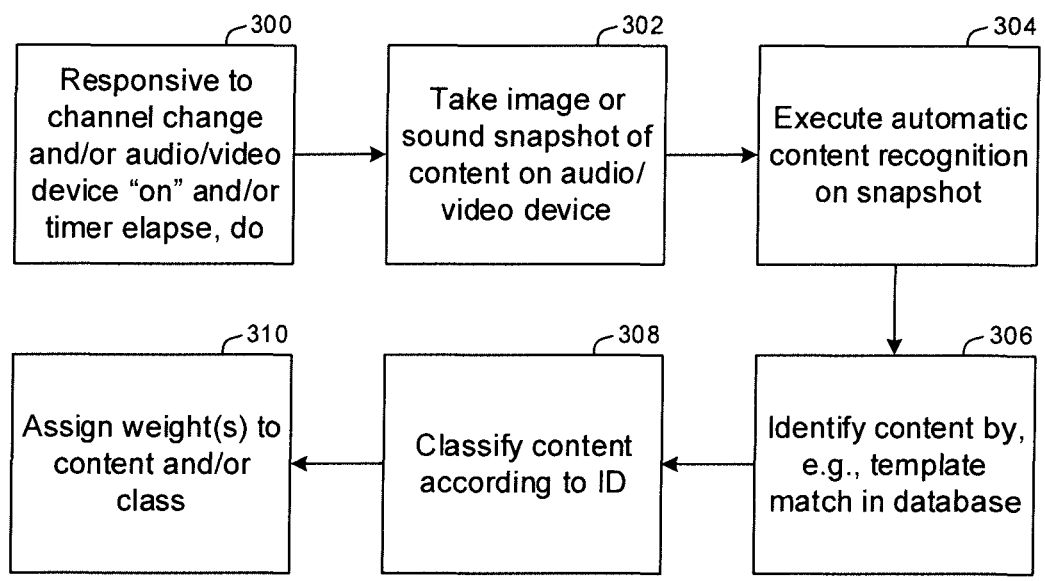
FIG. 3 is a flow chart of example ACR classification logic.

Note that the logic of FIG. 3 essentially constructs a viewer profile based on content that has been used. A profile may be constructed for each of plural viewers of a display device based on, e.g., viewer login to the display device, with ACR-based content weights being grouped by viewer login so that each individual viewer may have his or her own profile.

Figure 4:
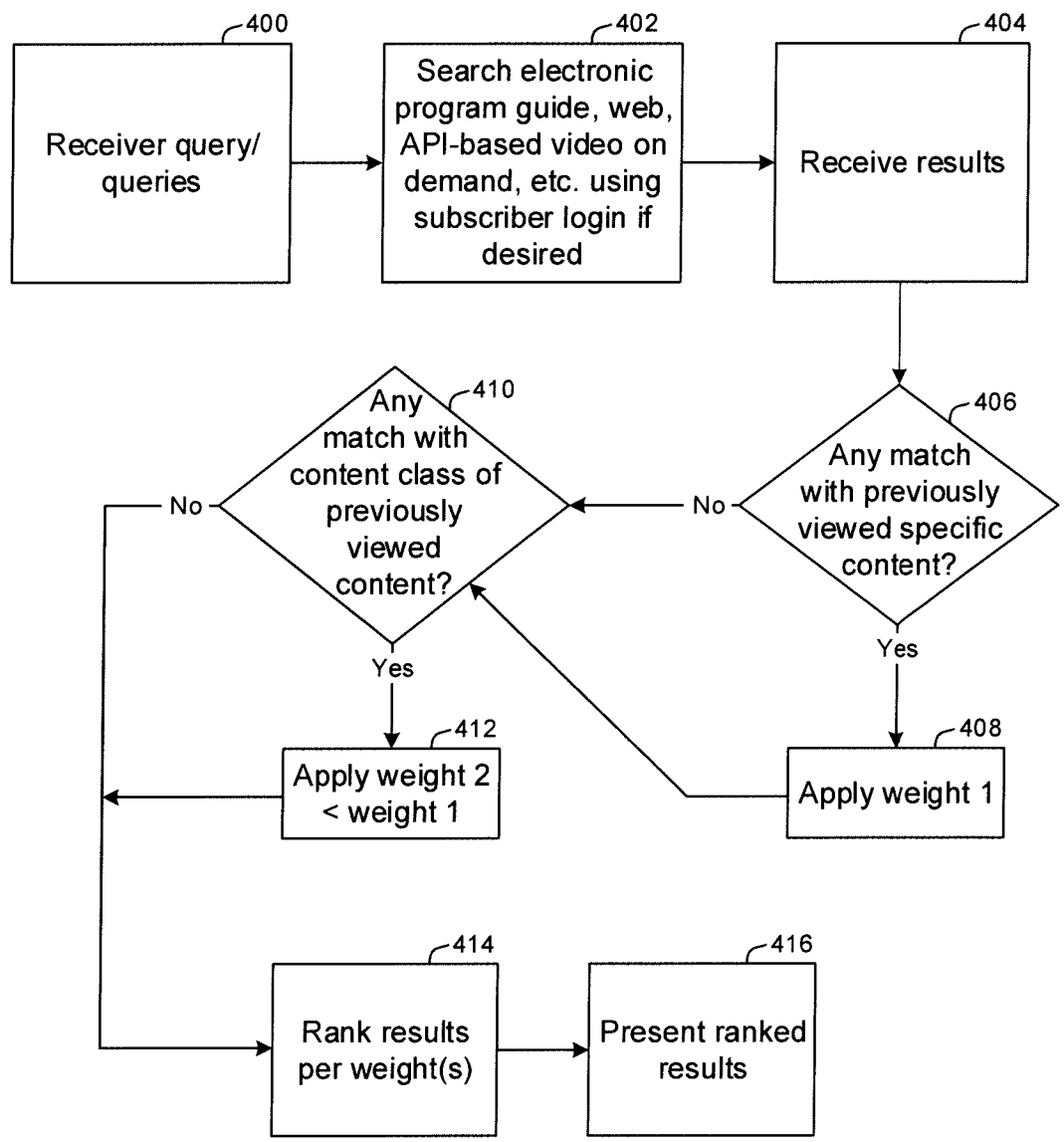
FIG. 4 is a flow chart of example search logic.

FIG. 4 illustrates how the ACR-derived weights of FIG. 3 may be used. A query may be received at block 400, either from a user inputting a query string, clicking on a piece of content being viewed to indicate a desire to search for similar content, etc.

Proceeding to block 402, one or two or more of different content sources may be searched to respond to the query. An EPG may be searched, and/or an API-based search of a movie provider's VOD database may searched, and/or the Internet may be searched, and/or local storage, e.g., on a digital video recorder (DVR) or video disk player may be searched. Subscriber login may be automatically input as desired to support such searches.

Results of the searches are received at block 404. Proceeding to decision diamond 406, it is determined whether any results match with specific content that has been previously viewed. Thus, for example, if specific content that has been viewed is "Movie A", it is determined whether any search results match "Movie A", which results can include web-based movie trailers, or future broadcast times of "Movie A" as returned by an EPG search, and so on. As another example, if the specific content previously viewed is a baseball game between the Dodgers and Angels on June 1, it is determined whether any search results match this specific game, which results can include web-based score sites for "Dodgers and Angels on June 1", or future broadcast times of highlights of "Dodgers and Angels on June 1" as returned by an EPG search, and so on.

A positive test at decision diamond 406 moves the logic to block 408, in which a weight is assigned to the match detected at diamond 406. From block 408 or from diamond 406 if the test there was negative, the logic moves to decision diamond 410 to determine whether any search results matched the classification of previously viewed content. If so, the logic assigns any such results a weight at block 412, which may be less than the weights assigned to specific content at block 408 as described previously.

From block 412 or from decision diamond 410 in the event of a negative test, the logic moves to block 414. At block 414 the search results are ranked according to the respective weights assigned at blocks 408 and 412, with results of greater weight being ranked above results of lesser weight. The ranked results are then presented at block 416. Examples of result presentation are given below.

Note that not only the order in which results are ordered for display, but also the number of results of a particular content type, may be based on the weights. For example and using only two content types for simplicity, if content type "A" has a weight of N and content type "B" has a weight of K, then the proportion of displayed results conforming to type "A" to the number of displayed results of type "B" that are presented in a single view may be according to the ratio of N/K or may be according to the difference between N and K.

To illustrate, assume ten search results are presentable in a view such as any of the views described below, and N=14 while K=6. Of the ten results, seven may be in type "A" and three in type "B". Or, because N=14>10, all ten of the results may be from type "A".

Figure 5:
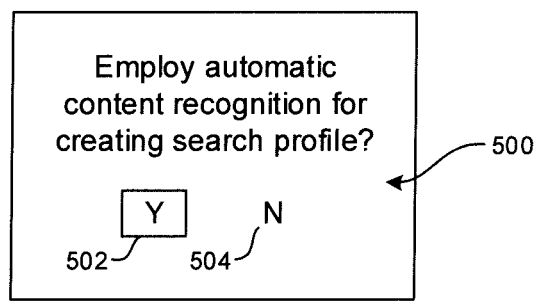
FIGS. 5-7 are example screen shots for setting up content searching.

FIG. 5 shows a user interface (UI) 500 that can be presented on any of the displays disclosed herein prompting a viewer to select to invoke the ACR-based weighting described above by selecting a yes selector 502. The viewer can decline by selecting no selector 504.

Figure 6:
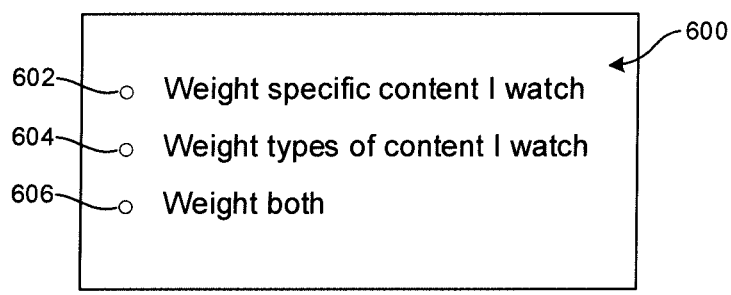

FIG. 6 shows a UI 600 that can be presented on any of the displays disclosed herein enabling a user to select at 602 to establish weights for specific content the viewer watches. The viewer may alternatively select 604 to establish weights for content types the viewer watches. The viewer may select at 606 to establish weights for both of the above.

Figure 7:
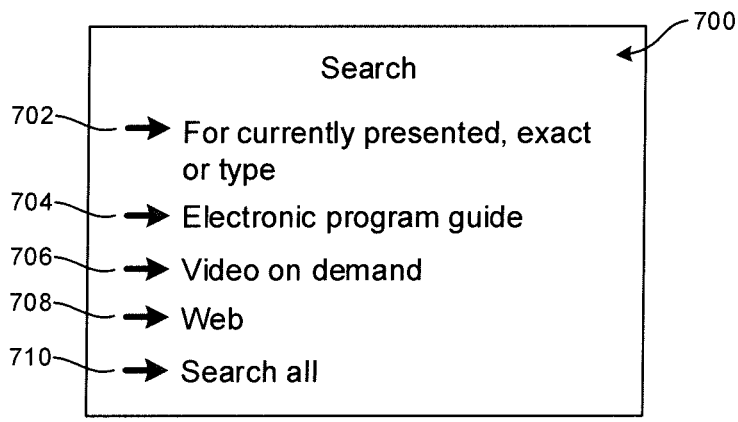

FIG. 7 shows a UI 700 that can be presented on any of the displays disclosed herein that enables a viewer to select at 702 to search for matches to the content currently being viewed on the display device. The user may select at 704 to search the EPG, and/or may select at 706 to search a VOD database, and/or may select at 708 to search the web. For ease of operation the user may select at 710 to search all of the enumerated content searches. A field (not shown) may be provided into which a user can enter a query string to search.

FIGS. 8-11 show various example search result carousels that may be presented. Controlling the search results using a carousel type presentation or other scrolling design allows for metadata related to that active window to be displayed alongside the running of the video search results window. The active search results window can be triggered to run a preview of the content, while a longer and more detailed explanation than would fit into the video window can be displayed alongside the results window. Thus the viewer can watch the video and also glance over at the metadata to get more detailed description of the story or event. Both can be synchronized together to provide second and third tier results as the user scrolls through search results.

Figure 8:
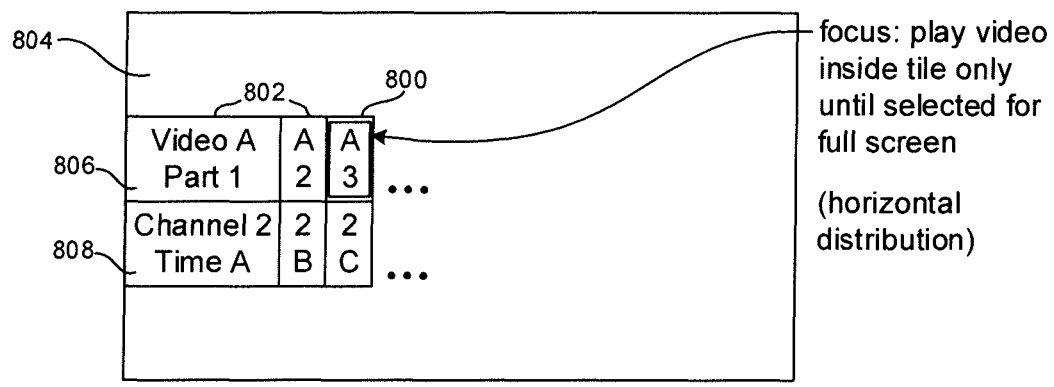
FIG. 8 is a screen shot of an example search presentation consistent with present principles.

FIG. 8 shows two horizontally-arranged carousels presenting search results according to the above-described weighted rankings, a first carousel 806 having tiles representing underlying assets from a search of local or cloud-based storage, and a second carousel 808 having tiles representing EPG search results of underlying TV channels. Each carousel 806, 808 can be independently "rotated" from the other by scrolling through the carousel.

Figure 9:
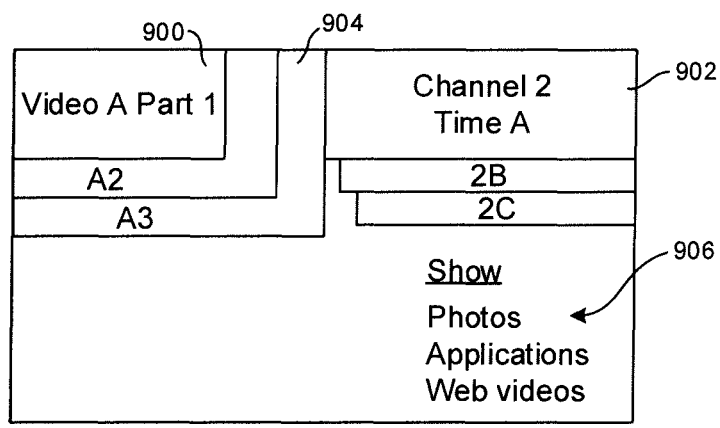
FIG. 9 is a screen shot of an example search presentation consistent with present principles.

FIG. 9 shows a video search results carousel 900 and a TV channel (EPG) search results carousel 902, except with the tiles of each carousel stacked vertically, with underlying tiles shown only at the edges 904 of the tiles. The top-most, fully visible tile is the one in focus. Note that in both FIGS. 8 and 9, only one carousel at a time need be shown. Thus, as shown at 806 in FIG. 8, a list of other source-related search carousels may be presents for selection of a carousel by a consumer for presentation of the selected carousel.

Figure 10:
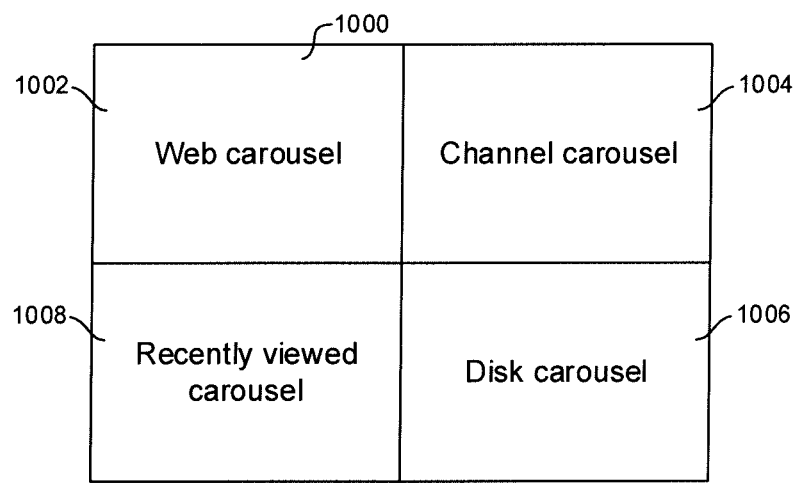
FIG. 10 is a screen shot of an example search presentation consistent with present principles.

FIG. 10 shows that multiple source type carousels such as any of the above may be presented simultaneously. As shown, a web video carousel 1000 may be presented on an AVDD 1002 along with a TV channel (EPG search results) carousel 1004, a video disk (e.g., DVD) search results video carousel 1006, and a recently viewed video carousel 1008, in which tiles represent the "N" most recently viewed video streams regardless of source.

Figure 11:
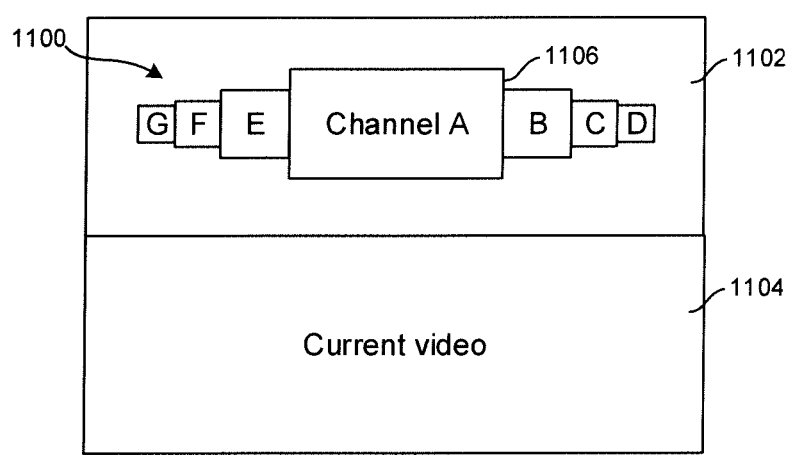
FIG. 11 is a screen shot of an example search presentation consistent with present principles.

FIG. 11 shows that a single carousel 1100 (in this case, containing tiles representing TV channels from an EPG search) can be presented on an AVDD 1102 above a current video pane 1104, although the carousel may appear below the pane or to the left or right of the pane in other embodiments. The carousel 1100 is presented as if the tiles were arranged on a disk, such that the center-most tile 1106 appears larger than the other tiles, which become progressively small from the center-most tile 1106 outward, as rotating disk may appear in three dimensions when viewed perpendicular to the plane of the disk. The middle tile 1106 is in focus, meaning the underlying video asset (decimated as appropriate) is played within it, with each of the remaining tiles presenting still images until the consumer "rotates" them into focus.

The principles of FIG. 11 may also be used to present tiles as being stacked in the Z-dimension, i.e., into the display. The tiles can be depicted as being overlaid on top of each other with depth between each tile's plane. The tiles can be scrolled and this is useful when the viewer wants to see the front tile active with video, yet with enough of the other tiles arranged behind it to recognize the portion still visible. Behind the main front tile in the scrolling z-plane carousel are the upcoming tiles that get larger as they approach the main front tile, analogous to what is shown in FIG. 11. Using the Z-plane in this example is also a way of managing canvas real estate when more than one selection exists and insufficient room exists in the X-Y plane to distribute all of the selections. The type of carousels thus can be used for fast visual search, tagging or dragging a tile the viewer wants onto the X-Y plane for viewing, the X-Y plane template view being a longer term always on experience, unless the viewer wants to view one item in full 4K mode for expanded viewing.

The Z-plane concept can also be used behind a tile that is in the X-Y plane. This concept is similar to the carousel that can be scrolled on the canvas to identify content. In this particular implementation the Z-plane tile exists behind the tile being highlighted or visible within a template. Though it cannot be seen, in place scrolling can be executed in which the next Z-plane choice comes to the front and replaces the tile currently visible. This "in place" tile scrolling is particularly efficient if the viewer is familiar with what is in the carousel associated with a particular tile or content source. It is fast in that the template is not swapped out for a carousel to view in the canvas, or where the template is minimized during search or set back but remains fully in place. The viewer in tile scroll mode simply clicks on that tile repeatedly to have the contents replaced with similar themed content assigned to that tile. In effect there would be a virtual carousel assigned to each tile in the Z-plane behind the tile.

Each section or tile that represents a discrete piece of content can be managed using an HTML5 canvas element that is controllable with specific WebGL based APIs. The AVDD manufacturer can also build a custom application for menuing that runs faster and utilizes Open GL ES or other graphics acceleration techniques to deliver a fast scrolling feed and to send individual commands to each tile for control. When each tile is highlighted or made active, a series of commands can be executed using XML or JavaScript to program the tile for the desired function.

While the particular USING AUTOMATIC CONTENT RECOGNITION (ACR) TO WEIGHT SEARCH RESULTS FOR AUDIO VIDEO DISPLAY DEVICE (AVDD) is herein shown and described in detail, it is to be understood that the subject matter which is encompassed by the present invention is limited only by the claims.

What is claimed is:

1. An apparatus comprising:
   at least one processor; and
   at least one computer memory including instructions executable by the at least one processor to:
   use automatic content recognition (ACR) of video to identify plural pieces of content viewed over time in historical viewing of an audio video display device (AVDD);
   conduct content searches of multiple sources and source types responsive to content queries using a content identifier code to match a content identifier code of content identified by the ACR to indexed content information to thus provide capability to determine a same piece of content from different sources; and
   arrange results of the content searches by weighting at least some items of the results of content searches according to the ACR of historical viewing.

2. The apparatus of claim 1, comprising the at least one processor executing the instructions.

3. The apparatus of claim 1, wherein the weighting includes weights correlated to specific pieces of content.

4. The apparatus of claim 1, wherein the weighting includes weights correlated to types of content with a type of content including plural specific pieces of content.

5. The apparatus of claim 1, wherein the instructions are executable to present the results of the content searches in an order defined at least in part by the ACR.

6. The apparatus of claim 1, wherein the instructions are executable to present a number of items in the results of the content searches according to the ACR.

7. A method comprising:
   using automatic content recognition (ACR) of video to identify plural pieces of content viewed over time in historical viewing of an audio video display device (AVDD);
   conducting content searches of multiple sources and source types responsive to content queries using a content identifier code to match a content identifier code of content identified by the ACR to indexed content information to thus provide capability to determine a same piece of content from different sources; and
   arranging results of the content searches by weighting at least some items of the results of content searches according to the ACR of historical viewing.

8. The method of claim 7, wherein the weighting includes weights correlated to specific pieces of content.

9. The method of claim 7, wherein the weighting includes weights correlated to types of content with a type of content including plural specific pieces of content.

10. The method of claim 7, comprising presenting the results of the content searches in an order defined at least in part by the ACR.

11. The method of claim 7, comprising presenting a number of items in the results of the content searches according to the ACR.

* * * * *